UNITED STATES PATENT OFFICE.

WILLIAM THOMAS ROBINSON-BINDLEY, OF WIMBLEDON, LONDON, AND ARTHUR WILLIAM WELLER, OF LONDON, ENGLAND.

DOPE OR SUBSTITUTE FOR CELLULOID, VULCANITE, AND THE LIKE.

1,331,127. Specification of Letters Patent. Patented Feb. 17, 1920.

No Drawing. Application filed February 20, 1919. Serial No. 278,246.

*To all whom it may concern:*

Be it known that we, WILLIAM THOMAS ROBINSON-BINDLEY and ARTHUR WILLIAM WELLER, subjects of the King of England, residing, respectively, in Wimbledon, London, England, and Oxford street, London, England, have invented certain new and useful Improvements in Dopes or Substitutes for Celluloid, Vulcanite, and the like, of which the following is a specification.

This invention relates to improvements in dopes, substitutes for celluloid, vulcanite and similar compositions of matter composed of or containing a phenol-formaldehyde condensation product, and to the production of materials of this kind, and has for its object to provide a substance having many of the characteristics of celluloid, vulcanite, etc., which is of reduced inflammability, and may be soluble in spirit.

It has been proposed to employ a number of different substances in conjunction with synthetic resins, vulcanite substitutes and the like, obtained by the condensation of phenols with formaldehyde, in order to modify the properties of these products. Thus, camphor, and camphor substitutes generally, have been proposed for incorporation with these condensation products, and it has also been proposed to make use of nitro-cellulose for preparing a varnish, and of cellulose derivatives in conjunction with a water soluble phenol-formaldehyde condensation product for the impregnation of fabrics for dyeing, but the use of camphene together with a cellulose-ester, as nitro- or aceto-cellulose, or with celluloid, according to the present invention, has not been described.

According to this invention there is combined with any of the phenol-formaldehyde condensation products such as the materials produced by the known processes for the condensation of phenol or cresols (without separation of the individual cresols) with formaldehyde or by the processes described in our United States applications Serial Nos. 278,247 and 278,248, filed February 20th, 1919, any cellulose derivative such as nitro-cellulose or cellulose acetate or mixtures of these cellulose derivatives, and camphene, or celluloid and camphene.

The material produced by this means will sheet to any desired thinness, being in this way similar to celluloid, is an electrical insulator, and is much less inflammable than celluloid alone.

The addition of the cellulose ester, or the celluloid, and camphene is made to the materials produced by the aforesaid known processes or those described in the specifications belonging to our aforesaid United States applications, preferably when the materials are in the semi-fluid condition prior to cooling after manufacture, though where the substances are of such a character that they can be re-melted, the addition can of course be made at any subsequent time.

The proportions of the materials employed will depend upon the kind of substance ultimately required. Thus, if celluloid is employed 150 parts may be dissolved in 200 parts by weight of acetone, and 5 parts by weight of camphene may be added, the whole being mixed in with the 100 parts of the condensation product and allowed to dry. These proportions are all by weight.

If cellulose acetate be used instead of celluloid, the quantity may be the same, the cellulose acetate being used in the condition in which it exists before camphor is used to solidify it, and to assist its mixing with 100 parts of condensation product 5 parts of camphene may be added. The mixture is afterward dried off at a temperature of approximately 40° C.

What we claim as our invention and desire to secure by Letters Patent is:—

1. A plastic composition comprising a phenol-formaldehyde condensation product, camphene and a cellulose derivative, substantially as described.

2. A plastic composition comprising a phenol-formaldehyde condensation product, camphene and celluloid, substantially as described.

3. A plastic composition comprising a phenol-formaldehyde condensation product produced without separation of the individual cresols, camphene and a cellulose derivative, substantially as described.

4. A plastic composition comprising a phenol-formaldehyde condensation product, camphene and a cellulose derivative, the weight of the phenol-formaldehyde condensation product being less than the weight of the cellulose derivative, substantially as described.

5. A plastic composition comprising 100 parts of a phenol-formaldehyde condensation product, 5 parts of camphene and 150 parts of celluloid, substantially as described.

In testimony whereof we have signed our names to this specification in the presence of two subscribing witnesses.

WILLIAM THOMAS ROBINSON-BINDLEY.
ARTHUR WILLIAM WELLER.

Witnesses:
HARRY I. RIDGE,
FRANK NOORE.